(No Model.)
LA VERNE W. NOYES.
TRACTION WHEEL.
No. 323,591. Patented Aug. 4, 1885.
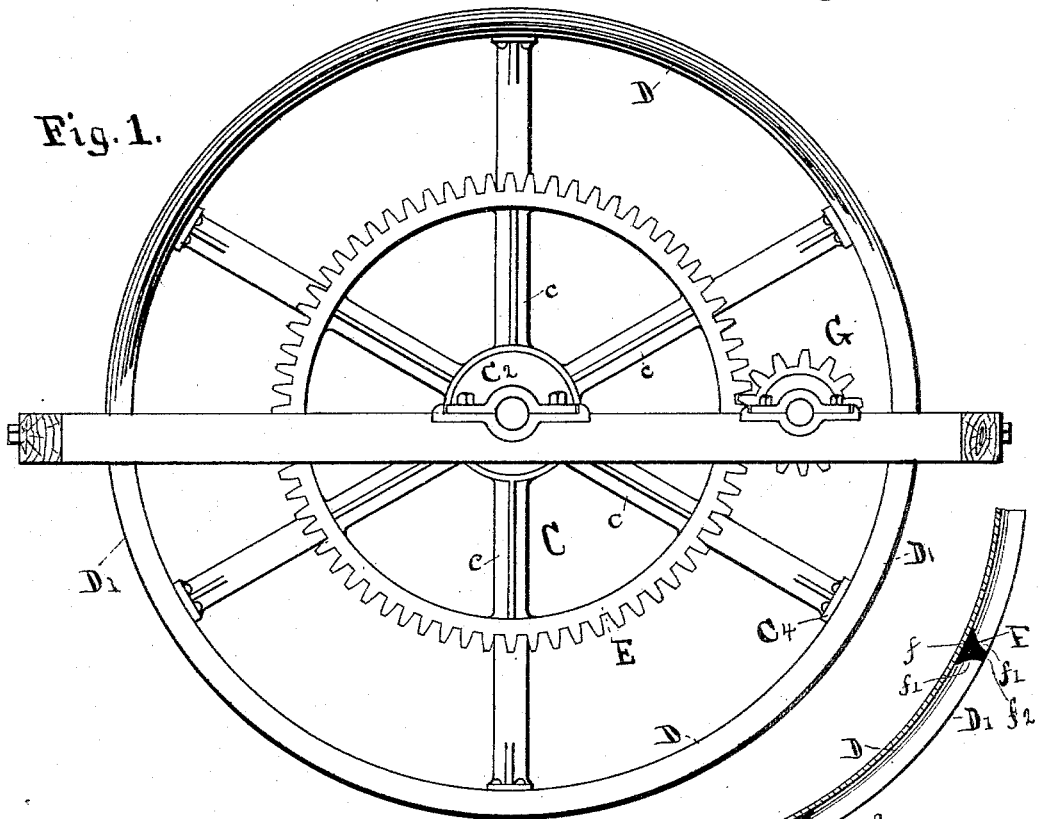
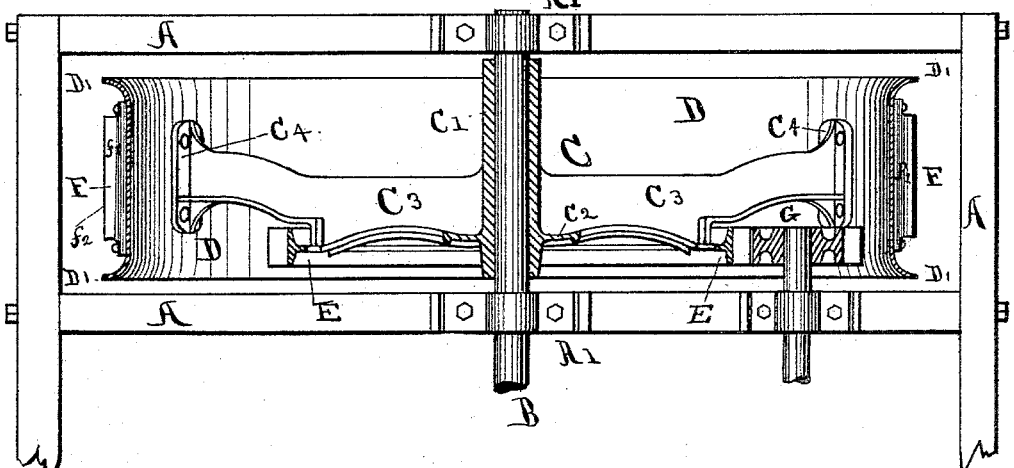
Witnesses:
Francis W. Parke
L. C. Riggs
Inventor:
LaVerne W. Noyes
by Chas. S. Burton
his atty.

UNITED STATES PATENT OFFICE.

LA VERNE W. NOYES, OF CHICAGO, ILLINOIS, ASSIGNOR TO WILLIAM DEERING, OF SAME PLACE.

TRACTION-WHEEL.

SPECIFICATION forming part of Letters Patent No. 323,591, dated August 4, 1885.

Application filed October 27, 1884. (No model.)

*To all whom it may concern:*

Be it known that I, LA VERNE W. NOYES, a citizen of the United States, and residing at Chicago, in the county of Cook and State of Illinois, have invented certain new and useful Improvements in Traction-Wheels, which are fully set forth in the annexed and following specification.

This invention relates to carrying and driving wheels for agricultural machinery, both such as being drawn by horses or other independent power have their mechanisms actuated by the motion communicated to the carrying-wheel by friction with the ground, and those which have motors mounted on and driving their carrying-wheels, and are propelled by the traction of such wheels upon the ground.

The purposes of the invention are to provide a wheel which shall be lighter in proportion to its strength, and more rigid in proportion to its weight, and better adapted to sustain both the dead-weight of the machinery mounted upon it and the strain due to driving the mechanism which may be geared to and receive motion from it than the wheels heretofore employed.

A further purpose is to provide a wheel with traction ribs or spurs, which shall not prevent its traveling smoothly and without jolting when driven upon hard ground.

A further purpose is to give such form to the flange and the attached traction-spurs as will reduce the tendency of the dirt to adhere thereto to a minimum.

Figure 1 is a side elevation. Fig. 2 shows a horizontal section of the driving-wheel and a plan of its frame. Fig. 3 is a vertical section of a portion of the rim of the wheel.

A is the frame. B is the axle of the driving-wheel, having its bearings in suitable boxes, A', on the frame A. C is the spider of cast metal, comprising the hub C', the web $C^2$, and the spokes $C^3$. The spokes are expanded laterally in planes at right angles to the plane of the rotation of the wheel, and strengthened by ribs C in the direction of the plane of rotation.

E is the gear-rim, which is secured in any convenient manner to or cast integral with the spider C. In either case the laterally-expanded webs of the spokes $C^3$ give it firm radial support. The spokes $C^3$ are expanded at their outer extremities into the flanges or foot-pieces $C^4$, adapted to rest against the inner surface of the rim D, which is securely bolted to said foot-pieces, as shown. The rim or flange D is formed of rolled iron plate or sheet forged into the shape illustrated in Fig. 2—that is, radially concave on its outer surface toward the earth, and convex on its inner surface toward the hub. The curvature of said concavity and convexity is preferably confined to near the edges D' of the flange, leaving the intermediate portion flat for convenience of joining thereto the spokes of the web on the inner surface and the traction-ribs on the outer surface.

F are traction ribs or spurs. Their form is best shown in Fig. 3. They have the surface $f$ fitted to the curve of the circumference of the rim D, and the two exposed surfaces $f'\,f'$, forming acute angles with the surface $f$, and concave in curves tangent to the circumference of the said rim D at the point of said acute angles, so that the curves of said surfaces blend with the curve of the said rim, and form no angles therewith at the junction. The height of the spurs F is less than the depth of the concavity formed, as described, in the outer surface of the rim D, so that the edge $f^2$ of the spur does not extend quite to the level of the edges of the rim. The spurs are preferably bolted to the rim, as shown.

G is a gear-pinion having its bearing in the frame A, driven by the gear-rim, and driving any connected mechanism which may be mounted on the frame.

Any mechanic will readily modify the structure as shown, to adapt it to an interior gear-rim instead of the exterior gear shown.

The form of the flange D, having the upturned edges D', renders it very rigid, and diminishes the danger of yielding or springing under the weight of the machine. The lateral expansion of the spokes prevents the lateral springing of the spider, while the gear E, secured to or integral with the spider, prevents the spokes from springing in the direction of rotation.

The form of the traction-ribs F, having their exposed curved surfaces tangent to the circumference of the rim, prevents the dirt clinging as it would in an angle if an angle were formed by the junction of the surface of the rib with the surface of the rim.

I claim—

1. A traction-wheel composed of the forged rim exteriorly concave and interiorly convex, the spider and the driving-gear rigid therewith, and the traction-ribs secured to the flange in its exterior concavity, substantially as and for the purpose set forth.

2. In a traction-wheel, the combination, substantially as hereinbefore set forth, of a flange or rim and the traction-ribs secured thereto, having their exposed surfaces curved tangentially to the circumference of the rim or flange, substantially as and for the purpose set forth.

3. The combination, substantially as hereinbefore set forth, of the spider C, the gear rim or flange E, the tread rim or flange D, and the traction-ribs F.

In testimony whereof I have hereunto set my hand in the presence of two witnesses, at Chicago, Illinois, this 19th day of July, A. D. 1884.

LA VERNE W. NOYES.

Attest:
I. K. WEST,
CHAS. S. BURTON.